United States Patent [19]

Nicolas et al.

[11] Patent Number: 5,272,496
[45] Date of Patent: Dec. 21, 1993

[54] IMAGE PROJECTOR WITH OPTIMIZED LUMINOUS EFFICIENCY

[75] Inventors: Christophe Nicolas, Paris; Brigitte Loiseaux, Villebon Sur Yvette; Jean-Pierre Huignard, Paris, all of France

[73] Assignee: Thomson-CSF, Puteaux, France

[21] Appl. No.: 922,499

[22] Filed: Jul. 31, 1992

[30] Foreign Application Priority Data

Aug. 6, 1991 [FR] France .................. 91 09997

[51] Int. Cl.⁵ .......................... G03B 21/14
[52] U.S. Cl. ......................... 353/34; 353/20; 353/31; 359/40
[58] Field of Search ............ 353/20, 31, 33, 34, 353/37, 81, 38; 359/37, 40, 63, 70

[56] References Cited

U.S. PATENT DOCUMENTS

| | | | |
|---|---|---|---|
| 4,650,286 | 3/1987 | Koda et al. | 353/31 |
| 4,913,529 | 4/1990 | Goldenberg et al. | 353/81 |
| 5,042,921 | 8/1991 | Sato et al. | 359/40 |
| 5,046,837 | 9/1991 | Stroomer et al. | 353/34 |
| 5,098,184 | 3/1992 | var der Brandt et al. | 353/31 |
| 5,105,265 | 4/1992 | Sato et al. | 353/31 |
| 5,153,621 | 10/1992 | Vogeley | 353/37 |
| 5,153,752 | 10/1992 | Kurematsu et al. | 353/31 |
| 5,181,054 | 1/1993 | Nicolas et al. | 353/31 |

FOREIGN PATENT DOCUMENTS

| | | |
|---|---|---|
| 0376395 | 7/1990 | European Pat. Off. |
| 0039084 | 2/1990 | Japan ............ 359/40 |
| 0221917 | 9/1991 | Japan ............ 359/40 |
| 8501630 | 4/1985 | World Int. Prop. O. |

OTHER PUBLICATIONS

Fourth International Colloquium on Advanced Television Systems, Jun. 25-29, 1990, R. Gerhard-Multhsaupt: "Evolution de la Technologie des Modulateurs de Lumiere pour la TVHD", pp. 1-15.

Primary Examiner—William A. Cuchlinski, Jr.
Assistant Examiner—William C. Dowling
Attorney, Agent, or Firm—Oblon, Spivak, McClelland, Maier & Neustadt

[57] ABSTRACT

Disclosed is an image projector wherein the illumination of an LCD matrix screen is done by means of two polarized beams coming from a same light beam that has no particular direction of polarization. The two polarized beams are obtained by a polarization separator whence these two polarized beams emerge with a square section. On the one hand, each polarized beam goes through at least two juxtaposed convergent lenses by which it is converted into two sub-beams which project their illumination spot on the matrix screen and, on the other hand, each convergent lens has a surface with a shape that is homothetic with the shape of the matrix screen. The luminous efficiency is thus improved through the matching of the shape of the section of the non-polarized light beam with that of the matrix screen.

18 Claims, 6 Drawing Sheets

IMAGE PROJECTOR WITH OPTIMIZED LUMINOUS EFFICIENCY

BACKGROUND OF THE INVENTION

1. Description of the Prior Art

The invention relates to image projectors in which the orthogonal and complementary directions of polarization of light are modulated in order to form an image to be projected.

In image projectors, notably video image projectors, the image projected on a screen results from a spatial modulation of light. The light produced by a source is guided up to a light modulation assembly that groups together the means required to achieve the spatial modulation of light. It is common practice to use a liquid crystal display (LCD) matrix screen or panel, comprising a matrix array of elementary liquid crystal cells, as a spatial light modulator. The liquid crystal cells are controlled through a video signal and each cell represents a pixel. The LCD matrix screen is thus an electro-optical slide.

2. Description of the Prior Art

The simplest way of forming an image by means of a liquid crystal display matrix screen is to illuminate it by a linearly polarized light. To this effect, it is common practice, firstly, to interpose a polarizer between the light source and the matrix screen, in order to select a particular direction of polarization for the the illumination of the matrix screen and, secondly, after the matrix screen, to position a second polarizer (which is then called a "polarization analyzer") which converts the angular modulation of polarization produced by the matrix screen into modulation of intensity. The major drawback of this method is that by the selection of a particular direction of polarization for the illumination of the LCD matrix screen more than half of the light energy is lost.

A known way of improving the efficiency of illumination of the LCD matrix screen is to separate or split the light spatially into two polarized beams having complementary directions of polarization, with a view to using all the light produced by the source. To this effect, several methods may be used:

(a) According to a first method (see European patent application No. 0.372.905), each polarized beam illuminates a different LCD matrix screen, and the images formed separately by the two LCD matrix screens are superimposed. The major drawback of this method is that it requires the use of two LCD screens per primary color, which leads to a very high cost of the image projector;

(b) another method consists of making the direction of polarization of one of the two polarized beams rotate by 90° so that the direction of polarization is the same in both polarized beams, and in then directing the two beams so as to illuminate the LCD matrix screen. A structure such as this is shown and described in the report (page 90) of the "EURODISPLAY" conference organized by the S.I.D. in Amsterdam in 1990.

Irrespectively of whether it is the method (a) or the method (b), described above, that is used, another major cause of the low luminous efficiency lies in the losses of light due to the differences between the shape of the LCD matrix screen and the shape of the section of the non-polarized light beam produced by the light source.

Thus, for example, in the context of the development of high-definition, wide-screen television sets, the image is provided with a 16/9 format (ratio of length to width). An image projector meeting this definition uses a spatial modulator screen having this format. In this case, if we assume, as in the most common example, that the non-polarized light beam produced by the souce has a circular section, the fraction of light energy used to illuminate the rectangle that constitutes the spatial modulator screen corresponds only to the ratio SR/SF of the surface area SR of this rectangle to the surface area SF of the section of the non-polarized light beam, namely 0.54. This corresponds to the optimum configuration, namely when the surface SR of the modulator screen has the 16/9 format and is as large as possible and is at the same time contained in the surface area SF of the section of the non-polarized light beam.

The present invention is aimed chiefly at reducing the losses of light due to the differences between the shape of the spatial modulator screen and the shape of the section of the non-polarized light beam, in image projectors using the two orthogonal and complementary directions of polarization of light. The invention can be applied both to monochromatic image projectors and to color image projectors.

SUMMARY OF THE INVENTION

According to the invention, there is proposed an image projector comprising at least one light spatial modulator screen, at least one light polarization separator or splitter illuminated by a non-polarized light beam delivered by a source, the polarization separator producing, in response, a first polarized beam and a second polarized beam having orthogonal directions of polarization of light with respect to each other, the light of these two polarized beams being designed to be modulated by the spatial modulator screen, said image projector further comprising means designed, firstly, to separate the light corresponding to at least one of the two polarized beams into at least two sub-beams each having a section, the shape of which is homothetic with that of the spatial modulator screen and, secondly, to superimpose the sub-beams on the spatial modulator screen.

An arrangement such as this has the advantage, in the case for example of a spatial modulator screen having the 16/9 format, illuminated by a circular-sectioned, non-polarized beam of light, to take the value of the fraction of luminous energy that illuminates this spatial modulator in the form of polarized light to 64%, giving an improvement of 1.2 over the prior art.

Another advantage of this arrangement is that it further enables a substantial improvement of the homogeneity in illumination of the spatial modulator screen owing to the fact that, for each polarized beam, firstly the two sub-beams correspond to different parts of the section of this polarized beam and, secondly, each of these two sub-beams illuminates the entire spatial modulator screen.

BRIEF DESCRIPTION OF THE DRAWINGS

The invention will be understood more clearly from the following description of certain of its embodiments, made with reference to the appended figures, of which.

MORE DETAILED DESCRIPTION

Figure 1:
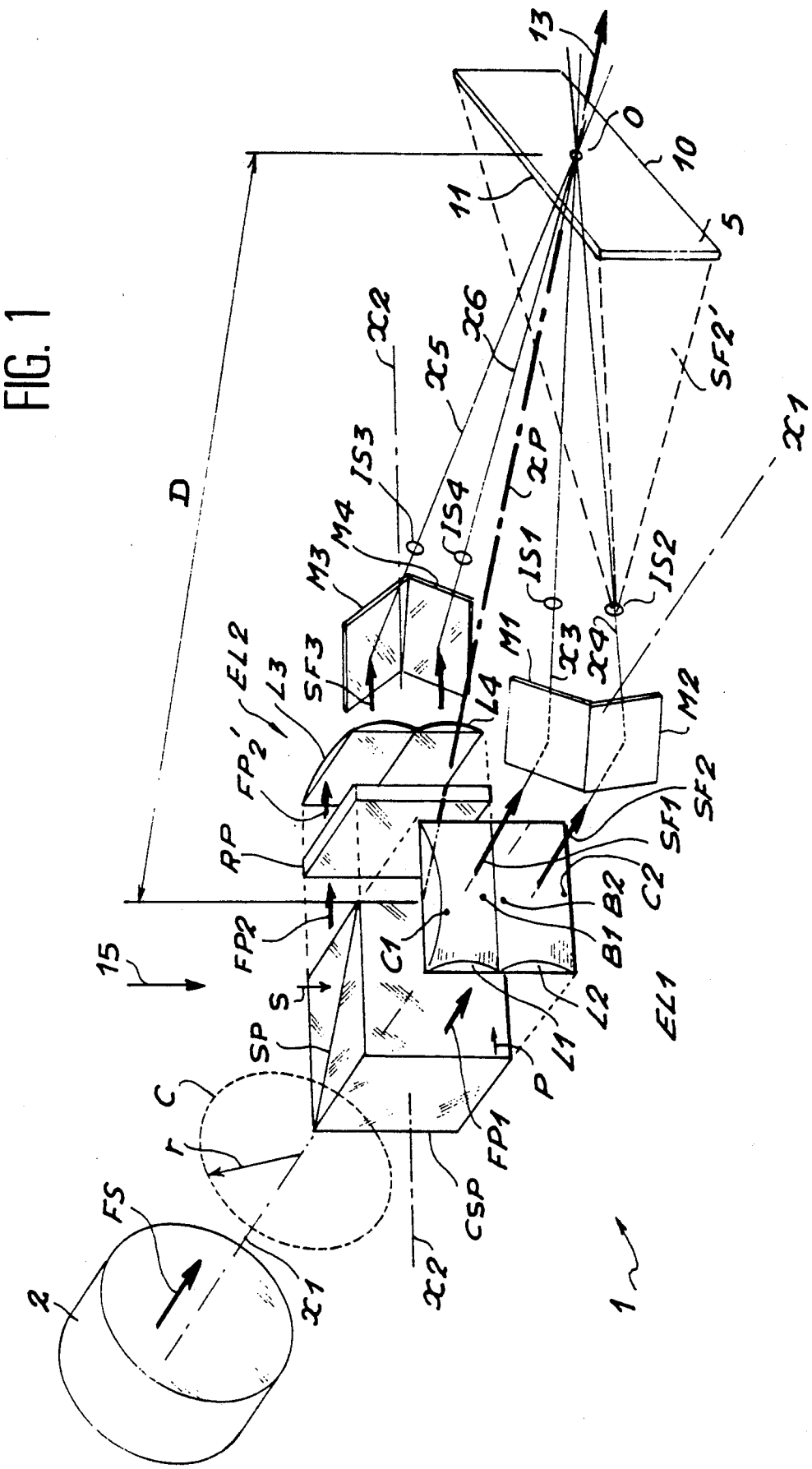
FIG. 1 shows a schematic view of a first simplified version of an image projector according to the invention.

FIG. 1 shows a partial schematic view of a first simplified version of an image projector 1 according to the invention.

The projector 1 comprises a light source 2 producing a light beam FS that does not have any particular direction of polarization. In a standard way, the rays of the beam FS are practically parallel to one other. To this effect, for example, the light source may be constituted by an illumination lamp (not shown) placed at the focal point of a parabolic reflector (not shown) or, again, at the focal point of a convergent lens. In the example, the light beam FS has a circular section represented by a circle C with a radius r.

The source beam FS is propagated along an axis of propagation x1 towards a polarization separator SP. The polarization separator SP may be of a standard type. It may be constituted, for example, by a polarization separator surface SP formed by a stack of thin films of dielectric materials, so as to cause the alternation of different indices of refraction according to a conventional technique. In the example shown in FIG. 1, the polarization separator surface SP is made in a polarization separator cube CSP, commonly available in the market.

The separator surface SP is located on the axis of propagation x1 and the normal to this surface SP forms, in a standard way, an angle (not shown) of 45° with this axis x1. The separator surface SP splits the source beam FS into two polarized beams FP1, FP2 with practically equal values of intensity but with directions of polarization that are perpendicular.

The first polarized beam FP1 is a transmitted beam which, having crossed the separator surface SP, gets propagated along the first axis of propagation x1. The light that constitutes the first polarized beam FP1 has a direction of polarization P parallel to the plane of incidence on SP (the plane of incidence being the plane that contains the mean incident ray of FS, i.e. the axis x1, and the normal to the separator surface SP).

The second polarized beam FP2 is a beam reflected by the separator surface SP along a second axis of propagation x2 forming an angle substantially equal to 90° with the first axis of propagation x1. The second polarized beam FP2 has a direction of polarization S perpendicular to the plane of incidence, i.e. it is orthogonal to that of the first polarized beam FP1.

The two polarized beams FP1, FP2 are designed to illuminate a spatial modulator screen formed, in the example, by an LCD type matrix screen 5 comprising, in a standard way, a plurality of "90° twisted nematic" type liquid crystals (not shown) arranged in lines and columns.

The two polarized beams FP1, FP2 should be modulated by the same matrix screen 5. To this end, a polarization rotator element RP is interposed on the path of either one of these two polarized beams in order to cause a 90° rotation of the polarization of the light forming the chosen beam. In the non-restrictive example described, the rotator element RP is positioned on the path of the second polarized beam FP2, on the second axis of propagation x2 and after the separator surface SP in order to effect a 90° rotation of the direction of polarization of this beam and bring it from the S type direction to the P type direction. Consequently, the second polarized beam emerges from the rotator element RP as a beam referenced FP2', the direction of polarization of which is of the P type, i.e. identical to that of the first polarized beam FP1.

Thus, two polarized beams FP1 and FP2' are obtained, having directions of polarization of a same type with respect to the plane on the separator surface SP and getting propagated along two axes x1, x2 that are perpendicular to each other. The light from these two polarized beams FP1, FP2' can therefore be modulated by the same liquid crystal display matrix screen.

According to one characteristic of the invention, before reaching the LCD matrix display 5, at least one of the two polarized beams EP1, EP2 is subjected to the effect of means that separate it into at least two polarized sub-beams, each having a section with a shape that is homothetic with the shape of the LCD matrix screen 5.

To this effect, in the non-restrictive example described, in emerging respectively from the separator cube CSP and from the polarization rotator RP, each of the first and second polarized beams FP1, FP2' gets propagated towards a set EL1, EL2 of lenses, called separator lenses in the rest of the description, formed by convergent lenses that are preferably identical and juxtaposed. Each set EL1, EL2 comprises at least two such lenses L1, L2 or L3, L4, each having a shape homothetic with that of the LCD matrix screen 5.

In the example illustrated in FIG. 1, where the non-polarized light beam FS has a circular section C, assuming that a radius r of this section has a length equal substantially to half of a diagonal of one face of the polarization separator cube CSP, each of the polarized beams FP1 and FP2 emerges from the separator cube with a square section that corresponds to the maximum surface area of a square inscribed within the circular section of the beam FS.

Assuming, firstly, that the spatial modulator screen 5 or LCD matrix screen 5 is rectangular with the 16/9 format, in accordance with the invention the shape of each lens L1, L2, L3, L4 is also rectangular with the 16/9 format.

In the non-restrictive example described, each set of lenses EL1, EL2 comprises only two separator lenses L1, L2 or L3, L4 in such a way that each polarized beam FP1, FP2 is thus converted (practically without any loss of energy) into two sub-beams SF1, SF2 and SF3, SF4, each being of the convergent type but having mean rays that are parallel in twos: these mean rays are parallel to the first axis x1 for the sub-beams SF1, SF2 coming from the first polarized beam FP1, and are parallel to the second axis x2 for the sub-beams SF3, SF4 coming from the second polarized beam FP2'.

Figure 2:
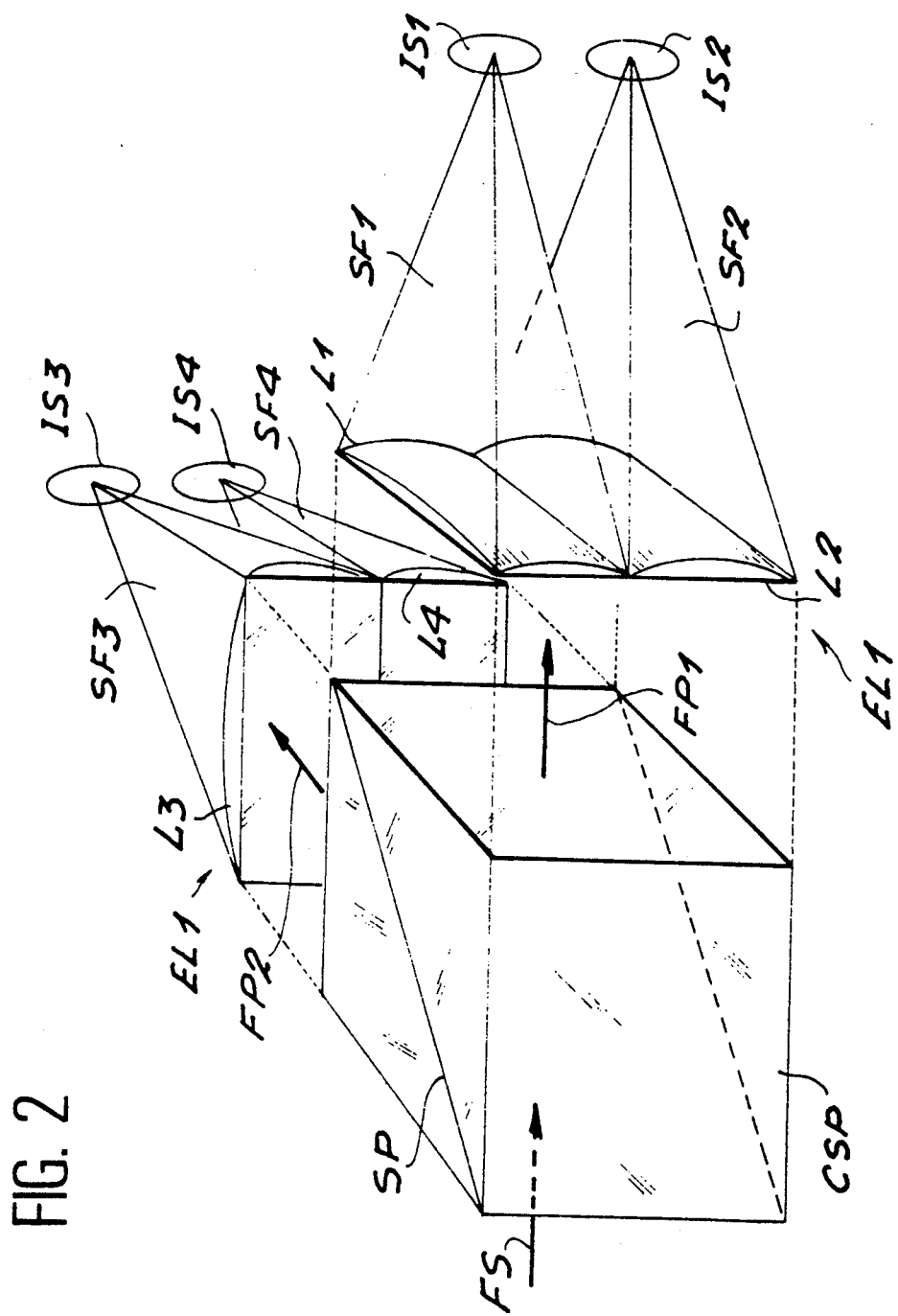
FIG. 2 illustrates the action of convergent lenses shown in FIG. 1.

FIG. 2 illustrates the principle of action of the separator lenses L1, L2 and L3, L4 on the polarized beams FP1, FP2. For the greater clarity of the figure, the polarization rotator element RP is not shown.

From the non-polarized light beam FS (having a circular section as described here above), the polarization separator cube CSP produces two polarized beams FP1, FP2, each with a square section, that are propagated in mutually perpendicular directions and have perpendicular and complementary directions of polarization.

Each of the polarized beams FP1, FP2 goes through two juxtaposed lenses L1, L2 (for FP1) and L3, L4 (for FP2) that are convergent and identical.

From each separator lens L1, L2 and L3, L4, there emerges a sub-beam of polarized light SF1, SF2 and SF3, SF4 that is convergent and forms, at the focal point of the separator lens that has produced it, an image IS1, IS2 and IS3, IS4 of the source (not shown) that has generated the light of the non-polarized beam FS.

In the example, for each polarized beam FP1, FP2, since the interposed separator lenses L1, L2 and L3, L4 are identical, the two images of sources IS1, IS2 or IS3, IS4 are in a same focal plane and these two images totalize the luminous energy that would be contained by a single source image which would be formed in a standard way by a single convergent lens (not shown) which would intercept the totality of a polarized beam FP1 or FP2.

Naturally, after the formation of a source image IS1 to IS4, each sub-beam SF1 to SF4 diverges and tends to preserve a section that is homothetic with the shape of the separator lens L1 to L4 which has generated it.

Referring again to FIG. 1, the action of the separator lenses L1 to L4 is similar to that described here above with reference to FIG. 2.

Figure 3:
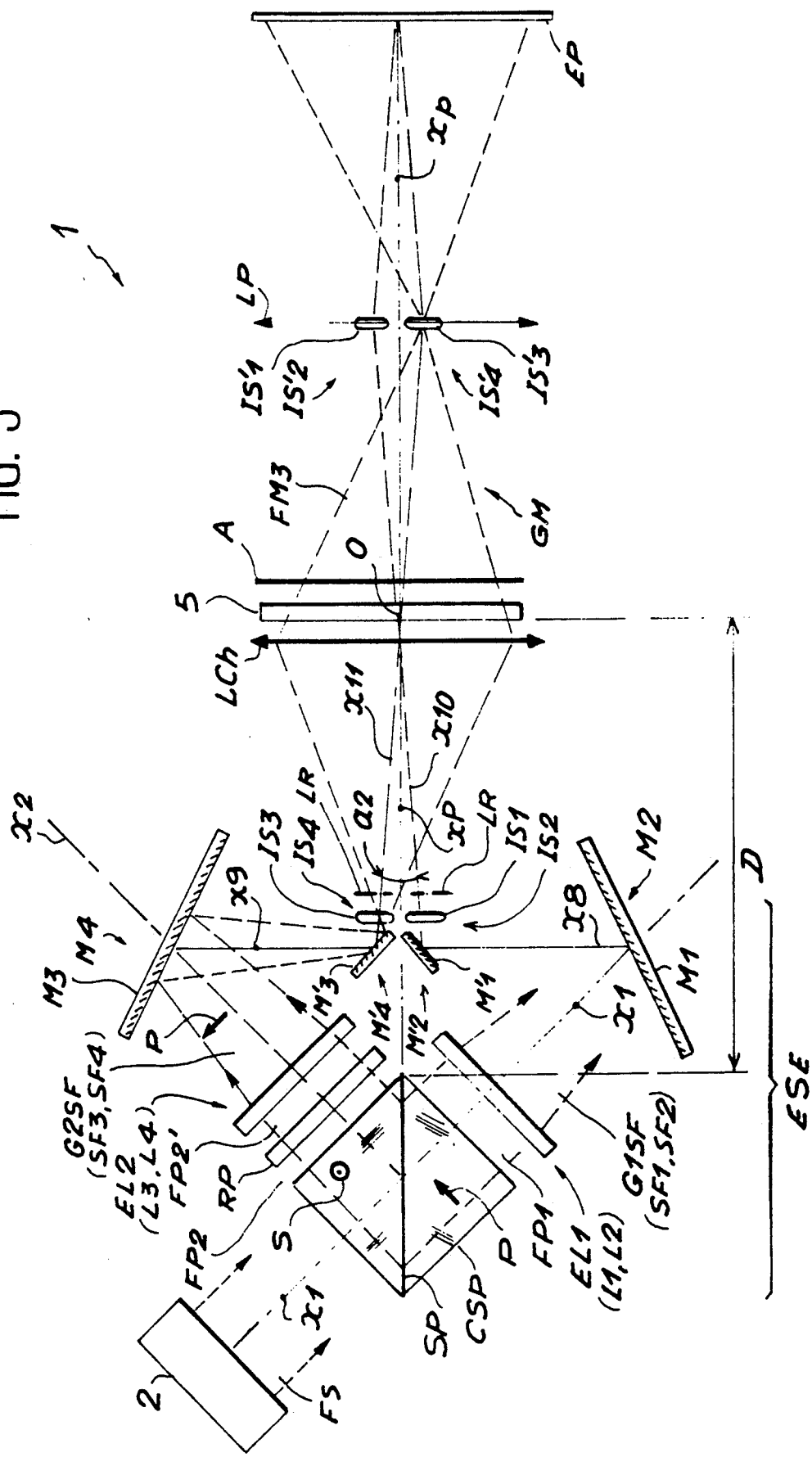
FIG. 3 gives a schematic view of a second preferred version of the invention.

As compared with the example of FIG. 2, it is observed that, in FIG. 3, a mirror M1, M2, M3, M4 is positioned on the path of each of the sub-beams SF1, SF2 and SF3, SF4 in order to orient them towards the LCD matrix screen 5.

The face of the matrix screen 5 is centered on a main axis xP which, in the non-restrictive example described, is located in a same plane as the one containing the separator surface SP; the main axis xP is normal to the plane containing the LCD matrix screen 5. The mirrors M1 and M2 on the one hand and the mirrors M3 and M4 on the other hand are positioned symmetrically with respect to the main axis xP, and they are oriented so as to reflect the sub-beams SF1 to SF4 towards the LCD matrix screen 5 along new axes of propagation x3, x4, x5, x6 which intersect at the center O of the matrix screen 5.

To this end, these mirrors M1 to M4 are oriented, firstly, to reflect each incident sub-beam SF1 to SF4 towards the matrix screen 5 and, secondly, to cause the convergence, towards each other, of the two sub-beams coming from the same polarized beam FP1, FP2, these two sub-beams being parallel when they emerge from the separator lenses.

Thus, for example, the first and second mirrors M1, M2 are positioned close to each other on one side of the main axis xP and are given the role of deflecting and bringing about the convergence, towards each other, of the first and second sub-beams SF1, SF2; while the third and fourth mirrors M3, M4 are close to each other, on the other side of the main axis xP, and are given the role of deflecting and bringing about the convergence of the third and fourth sub-beams SF3, SF4.

As has been explained with reference to FIG. 2, firstly, the sub-beams SF1 to SF4 each form an image IS1 to IS4 of the source. In the example of FIG. 1, this is achieved after reflection by the mirrors M1 to M4. Secondly, after the formation of the image of the source, each sub-beam SF1 to SF4 becomes divergent and tends to keep a shape homothetic with that of the separator lens L1 to L4 from which it comes. This is shown in FIG. 1 with the sub-beam SF2 which, after reflection by M2 and after having formed the second source IS2, diverges in keeping a rectangular shape with is homothetic with that of the second separator lens and hence the LCD matrix screen 5 and which, in the form of the sub-beam SF2, forms an illumination spot on this matrix screen 5.

This is also true for the other sub-beams in such a way that the illumination spots of the four sub-beams SF1 to SF4 get superimposed on the surface of the LCD matrix screen 5 in coinciding with the dimensions of this screen.

It is thus possible to cut a first square-sectioned polarized beam FS out of the circular section of the non-polarized light beam FS and obtain the second polarized beam FP2, also having a square section, so that for the obtaining of each of these polarized beams FP1, FP2, the loss in light energy does not exceed 36%.

Then, this luminous efficiency may be preserved by the fact that, firstly, for each polarized beam FP1, FP2, or rather FP2', the square section of this beam is cut out by convergent lenses, each producing a sub-beam, the section of which is homothetic with respect to that of the spatial modulator screen 5 or LCD matrix screen; and by the fact that, secondly, the illumination spots of the different sub-beams are superimposed so as to coincide with the surface of this matrix screen 5. Given the fact that the 16/9 format is a rectangle, the length of which is equal to almost twice its width, the invention can be applied in an especially promising way in the case of the 16/9 format for which it is then enough to cut out each polarized beam by means of only two rectangular separator lenses.

However, the number of rectangular separator lenses used to cut out the square section of a polarized beam FP1, FP2 is not limited. It is possible to conceive of a matrix with a number of rectangular lenses equal to N×N. This would have the advantage of making the illumination of the LCD matrix screen 5 even more homogeneous.

Indeed, even with only two separator lenses per polarized beam, the homogeneity of illumination of the matrix screen is greatly improved. In general, the points that are towards the center of the section of the beam FS are more luminous than those located towards the periphery, and this inhomogeneous distribution is found again in the square section of a polarized beam, the first beam FP1 for example when it emerges from the polarization separator cube CSP.

With the presence of the two separator lenses L1, L2, two points B1, B2 close to the center but corresponding to different lenses L1, L2, are projected on the LCD matrix screen 5 towards the edges 10, 11, opposite this screen 5, where they get added to rays coming from the periphery of the polarized beam such as points referenced C1 and C2 respectively on the first and second separator lenses L1, L2. There is therefore an addition of an illumination coming from the center (which is generally stronger) with an illumination coming from the edge (which is generally weaker), the result of which is improved homogeneity of illumination.

After having crossed the LCD matrix screen 5, the four sub-beams SF1 to SF4 get propagated along a mean direction 13 towards a projection screen (not shown in FIG. 1) on which they each project the image resulting from their modulation by the LCD matrix screen 5; this is accomplished by means that are standard per se (not shown in FIG. 1) such as, for example, a field lens, an analyzer, a projection objective.

It must be noted that the structure shown in FIG. 1 may have a drawback which is commonly encountered in conventional projectors and lies in the fact that this structure may result in the projector's having a relatively substantial bulk owing to the great distance D between the polarization separator SP and the LCD matrix screen 5; this distance D should be great in order to prevent the sub-beams SF1 to SF4 from getting propagated towards the matrix screen 5 in forming a big angle between the two sub-beams SF1, SF2 coming from the first polarized beam FP1 or the two sub-beams SF3, SF4 coming from the second polarized beam FP2': failing this, it will be necessary to use a projection objective with a very wide objective.

Given the effect of convergence of the separator lenses L1 to L4, the invention lends itself especially well to the making of an assembly as illustrated in FIG. 3, by which it is possible to reduce the distance D while at the same time preserving a small-aperture projection objective.

As compared with FIG. 1, FIG. 3 shows a top view as symbolized in FIG. 1 by an arrow 15.

FIG. 3 gives a schematic view of the projector 1, in a top view, the consequence of which is the masking of one of the two sub-beams SF1, SF2 and SF3, SF4 coming from each polarized beam FP1, FP2. The version of the invention shown in FIG. 3 is similar to that shown in FIG. 1 up to the instant when the sub-beams reach the mirrors M1 to M4.

The non-polarized light beam FS is propagated on the first axis x1 towards the polarization separator cube CSP. A part of this light is transmitted by the separator surface SP. This part constitutes the first polarized beam FP1 having the direction of polarization P and being propagated towards the first set EL1 of lenses, only the first separator lens L1 of which can be seen. Since the second separator lens L2 is beneath the first lens, it is masked by the latter.

Another fraction of the light coming from the beam F3 is reflected by the separator surface and constitutes the second polarized beam FP2, having the direction of polarization S which is orthogonal and complementary to the direction of polarization P. The second beam FP2 gets propagated along the second axis x2, towards the polarization rotator RP which it crosses to become the second polarized beam FP2' having the P type direction of polarization like the first beam FP1. The second polarized beam FP2 then gets propagated towards the second set EL2 of lenses, of which only the first separator lens L1 can be seen, the second lens L2 being masked by the first lens L1.

As in the previous example, each polarized beam FP1, FP2' goes through a set EL1, EL2 of lenses: this gives rise to at least two convergent type sub-beams SF1, SF2 for the first polarized beam FP1 and at least two convergent type sub-beams SF3, SF4 for the second polarized beam FP2'.

For the greater clarity of FIG. 3, since the two sub-beams coming from a same polarized beam FP1, FP2 are on top of one another, they form a same group of sub-beams G1SF for the two sub-beams SF1, SF2 coming from the first polarized beam FP1 and G2SF for the two sub-beams SF3, SF4 coming from the second polarized beam FP2'. Consequently, the two sub-beams of a same group are merged within same boundaries (the boundaries of the first group G1SF of sub-beams being only partially represented).

The first and second group of sub-beams G1SF, G2SF get propagated respectively towards the mirrors M1, M2 and M3, M4 (the second and fourth mirrors M2, M4 being masked in the figure), respectively along the first and the second axis x1, x2 which are perpendicular to each other.

As in the previous example, the LCD matrix screen 5 is centered on the main axis xP which passes through the plane containing the separator surface SP.

One difference with the structure shown in FIG. 1 is that, in this version, the sub-beams SF1 to SF4 are not reflected directly towards the LCD matrix screen 5 but are reflected towards the main axis xP, along an eighth and a ninth axis x8, x9 which intersects this main axis between the matrix screen 5 and the separator cube CSP, as close as possible to the latter.

Before reaching the main axis xP, each group G1SF, G2SF of sub-beams is reflected a second time by mirrors M'1, M'2 for the first group of sub-beams and M'3, M'4 for the second group, positioned in the vicinity of the main axis xP. These second reflections have the effect of orienting the groups G1SF, G2SF of sub-beams towards the LCD matrix screen 5 so that the mean axes of the different sub-beams SF1, SF2 and SF3, SF4 intersect one another by the main axis xP and substantially at the center O of the LCD matrix screen 5.

For the sub-beams SF1, SF2 of the first group G1SF, the first sub-beam SF1 is reflected towards the screen 5 by a fifth mirror M'1 along a second axis x10 by which this first sub-beam is shown in FIG. 3. In accordance with the same effects as in the previous example, the first sub-beam SF1 produces the first source image IS1 but, in the present case, this source image is formed very close to the main axis xP after the second reflection. As regards the second sub-beam SF2 which, in FIG. 3, gets propagated in a deeper plane than the first sub-beam, after reflection by the second mirror M2, it gets propagated along an axis which appears to be merged with the eighth axis x8, towards the main axis xP, and encounters a sixth mirror M'2 (which cannot be seen in FIG. 3 because it is located beneath the fifth mirror M'1 and is masked by the latter) by which it is deflected a second time, towards the screen 5 along an axis which appears to be merged with the tenth axis x10. After this second reflection, this second sub-beam SF2 forms the second source image IS2 which, in being formed in a deeper plane than the first source image IS1, is masked by the latter.

For the second group G2SF formed by the third and fourth sub-beams, the third sub-beam SF3 (which is the only one whose boundaries are shown in dashes) is reflected a second time, by a seventh mirror M'3, towards the matrix screen 5 along an eleventh axis x11. After its second reflection, it forms the third source image IS3 in the vicinity of the main axis xP and of the images IS1, IS2. The fourth sub-beam SF4 gets propagated in a deeper plane than that of FIG. 3 and, after a second reflection on an eigth mirror M'4 (masked by the seventh mirror M'3), it is oriented towards the matrix screen 5 along an axis which appears to be merged with the eleventh axis x11. This fourth sub-beam SF4 forms the fourth source image IS4 which is masked in FIG. 3 by the third image IS3.

Under these conditions, the four source images IS1 to IS4 are formed about the main axis xP in the vicinity of this axis in such a way that, even for a small length of the distance D between the separator cube CSP and the matrix screen 5, there is obtained a small angle a2 formed between the two axes x10 and x11 along which the sub-beams SF1 and SF3 get propagated towards the matrix screen 5.

The illumination spots of the four sub-beams are superimposed on the matrix screen 5, in a same way as in the previous example. To this end, it may be advantageous to place a lens called a "relay lens" LR on the path of each sub-beam SF1 to SF4 and in the plane containing each source image IS1 to IS4, each relay lens having the function of achieving an optical conjugation between a separator lens L1 to L4 and the LCD matrix screen 5. The four illumination spots (each produced by a sub-beam SF1 to SF4) are then substantially in coincidence with the dimensions of the matrix screen 5. It must be noted that relay lenses LR may be used with this same function in the case of the example shown in FIG. 1.

In the non-restrictive example described, a field lens LCh is positioned on the main optical axis xP in the vicinity of the matrix screen 5, as close as possible to the point of intersection of the axes of propagation x10, x11 of the sub-beams SF1 to SF4. The field lens LCh has the function of forming images IS'1, IS'2, IS'3, IS'4 of the source, in the plane of the input pupil of an objective or system of projection LP (represented schematically in the figure by a lens) located on the main optical axis xP, opposite the field lens LCh with respect to the matrix screen 5.

The enlargement of this optical conjugation is such that IS'1 to IS'4 are entirely within the aperture of the projection objective LP.

The liquid crystal cells (not shown) of the matrix screen 5 are activated in a manner that is standard per se (not shown), for example by a video signal. This activation of the cells results in an angular modulation of the direction of polarization of the light rays which go through these cells, i.e. on the rays that constitute the sub-beams SF1 to SF4 formed out of the two polarized beams FP1, FP2'. This angular modulation is converted into a modulation of intensity in a manner that is standard per se, by means of a polarization analyzer A which has the function of selecting a particular direction of polarization (the analyzer works, in this case, as a polarizer).

Thus, if the matrix screen 5 is looked at through the analyzer A, the video image is seen. This image may be projected on the projection screen EP by means of the projection objective LP.

In the examples shown, the polarization rotator element RP is placed on the path of the second polarized beam FP2 in order to give the two polarized beams one and the same direction of polarization. Naturally, this can be obtained also by causing a rotation in the direction of polarization of the first polarized beam FP1. In this case, there is no polarization rotator element on the path of the second beam FP2 which keeps the S type of direction of polarization (shown as being perpendicular to the plane of the figure). By contrast, a rotator element must then be interposed on the path of the first polarized beam FP1 to achieve a 90° rotation in its direction of polarization and bring it from the P type direction to the S type direction.

It must be noted that the 90° rotation of the direction of polarization may be obtained in a standard way by means of a rotator of the type formed by a crystal plate known as a "half-wave" plate. However, a plate such as this has the drawback of being chromatic, i.e. it works accurately only for one wavelength and for a relatively narrow spectral band around this wavelength. Hence, especially for applications to the color images that are referred to here below in the description, it is useful for the polarization rotator element RP to be constituted by a liquid crystal cell of the 90° twisted nematic type working in a so-called waveguide mode. A cell such as this fulfils the desired function while at the same time being less costly and less chromatic. Naturally, a cell such as this needs to be appropriately oriented with respect to the directions of propagation and polarization of either of the two polarized beams FP1, FP2.

Figure 4:
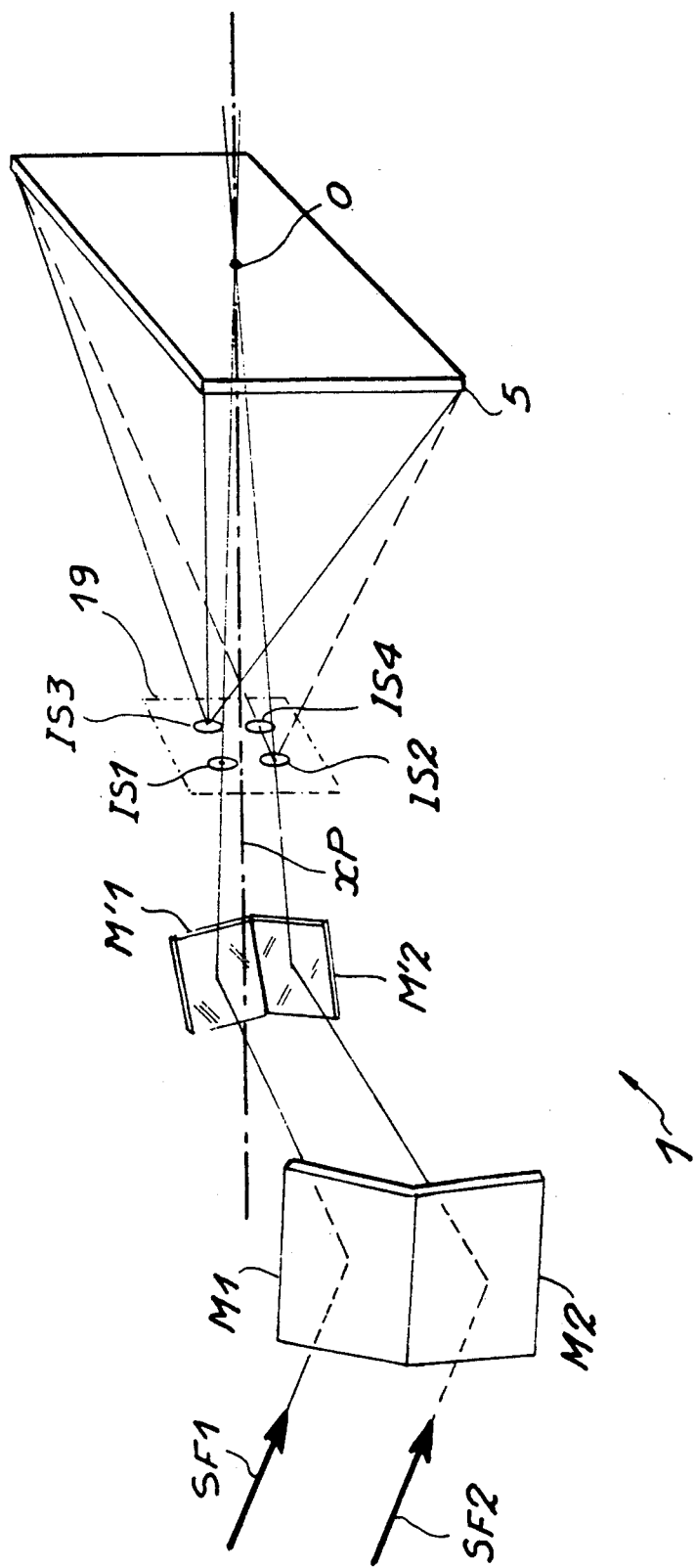
FIG. 4 shows a view, in perspective, of certain elements of the second version of the invention.

FIG. 4 is a view in perspective that shows the projector 1, in the version already explained with reference to FIG. 3, with a view to illustrating the superimposition of the illuminations on the matrix screen 5. For an improved understanding of FIG. 4, the representation of the projector is limited to the LCD matrix screen 5 and to the mirrors M1, M2 and M'1, M'2 used to orient the two sub-beams SF1, SF2 produced from the first polarized beam FP1.

The matrix screen 5 is centered on the main axis xP, and the mirrors M3, M4 and M'3, M'4 (not shown) used for the sub-beams coming from the second polarized beam FP2 are positioned opposite and symmetrically.

The first sub-beam SF1 is reflected a first time by the first mirror M1 towards the fifth mirror M'1 located in the vicinity of the main axis xP. It is reflected a second time by the fifth mirror M'1 which orients it towards the matrix screen 5. After this second reflection, it forms the image IS1 of the source before becoming divergent and forming an illumination spot (not shown) which is projected on the surface of the matrix screen.

The second sub-beam SF2 follows a similar path. It is reflected a first time by the second mirror M2 towards the sixth mirror M'1, and then it is reflected a second time by the latter mirror which orients it towards the matrix screen 5. After this second reflection, it forms the second image IS2 of the source, then diverges and tends to keep a section with a shape that is homothetic with that of the matrix screen 5. The section of the second sub-beam SF2 is shown in the figure in dashes.

The third and fourth sub-beams SF3, SF4 form the third and fourth source images IS3, IS4 from which these sub-beams diverge and tend to keep a section that is homothetic with the surface of the matrix screen 5, so as to superimpose their illumination on this screen 5. In FIG. 4, the rectangular section of the third sub-beam SF3 is shown in solid lines, from the third source image IS3 onwards.

The four source images are thus distributed symmetrically about the main axis xP, in a same plane represented by a square 19. The ideal arrangement is for these four source images to be formed very close to the main axis xP, for example to the point of touching each other.

The examples of FIGS. 1 and 3 relate to a projector comprising a single spatial modulator screen working either with a polychromatic light or with a monochromatic light, and producing either a color image or a black and white image. However, the advantages provided by the invention are also valid for a color image projector comprising several modulator screens.

Several main functions may be emphasized in the projector 1 shown in FIG. 3 for example. Some of these functions have to be reproduced several times in a color projector:

Among these main functions, there is the separation of the orthogonal polarizations P, S into two polarized beams FP1, FP2 or FP2', then the separation of the beams FP1, FP2 or FP2' of polarized light into sub-beams SF1 to SF4; then the orientation of these sub-beams towards the matrix screen 5, an orientation that leads to the formation of the source images IS1, IS2 in the vicinity of the main optical axis xP.

To facilitate the rest of the description, the elements that perform these functions are grouped together in an assembly called a "separating-orienting assembly" ESE (illustrated in FIG. 3) in which the sub-beams respectively form the source image IS1 ti IS4 in the vicinity of the main axis xP, as in the example of FIGS. 3 and 4. To simplify the following figures, firstly the four source images IS1 to IS4 are represented by a group of source images GS symbolized by a rectangle in dashes and, secondly, the different sub-beams that give rise to these source images are represented by a single arrow drawn in a thick line, called a main group of sub-beams GP.

Another important function to be distinguished is the modulation function fulfilled by the matrix screen 5. The matrix screen 5 and the field lens LCh are grouped together in another assembly called a "modulation assembly" EM. As for the sub-beams SF1 to SF4 which go through the matrix screen 5, they emerge from this screen 5 in constituting modulated sub-beams FM1, FM2, FM3, FM4 represented by the axes along which they are propagated (indeed, for the greater clarity of FIG. 1, only the boundaries of the third modulated sub-beam FM3 are shown). These two modulated sub-beams are intended to form one and the same image and, hereinafter in the description, they are called a "group of modulated beams GM".

Finally, a separating-orienting assembly ESE followed by a modulator assembly EM, as shown in FIG. 1, is called a "monochromatic device" DM.

Figure 5:
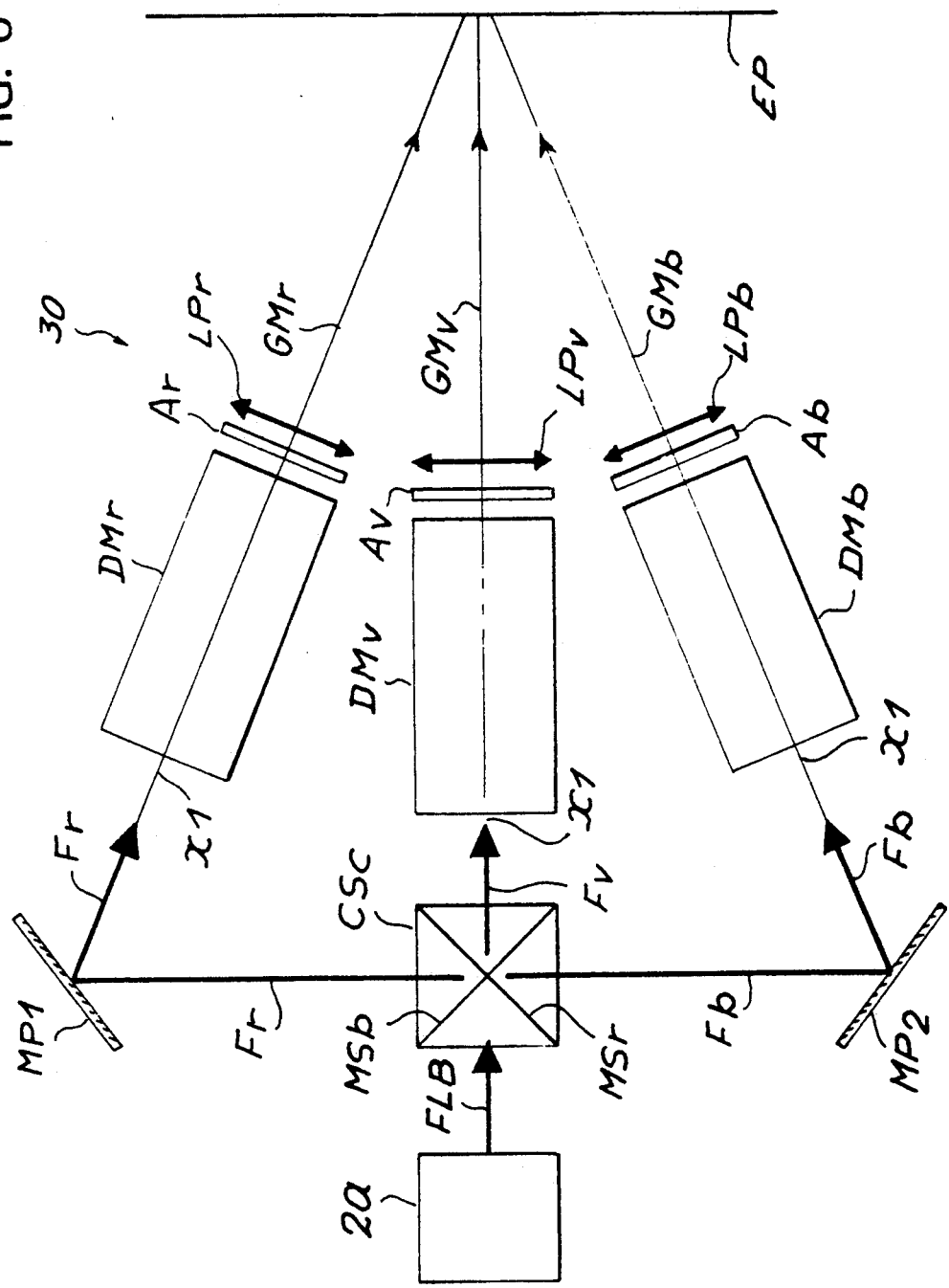
FIG. 5 shows the diagram of a color image projector.

FIG. 5 gives a schematic view of an application of the invention to a projector 30 of color images, in which the color results from the combination of several primary colors such as, for example, red, green and blue.

The projector 30 has a first, second and third monochromatic device $DM_r$, $DM_v$, $DM_b$ respectively assigned to the processing of a red, green and blue light. Each monochromatic device is similar to the one explained with reference to FIGS. 1 to 4, and has an axis of propagation x1 on which there is propagated a beam of non-polarized monochromatic light $F_r$, $F_v$, $F_b$, the spectrum of which corresponds to the color of the corresponding monochromatic device.

Each of these non-polarized monochromatic beams may be produced from a particular source of light or, as shown in FIG. 2, from a single source of white light 2a. In the latter case, the beam of white light FLB is separated into three monochromatic beams $F_r$, $F_v$, $F_b$ of different colors, by means of wavelength-selective elements such as, notably, dichroic filters, for example by means of a standard dichroic cube CSC: a wavelength-selective mirror $MS_r$ reflects a red component forming the monochromatic beam $F_r$ which is propagated towards the monochromatic device $DM_r$ after reflection by a plane mirror $MP_1$. Another selective mirror $MS_b$ reflects a blue component forming the monochromatic beam $F_b$ which is propagated towards the monochromatic device $DM_b$ after reflection by a plane mirror $MP_2$. The green component forming the beam $F_v$ is transmitted directly towards the monochromatic device $DM_v$.

Each monochromatic device is followed by an analyzer $A_r$, $A_v$, $A_b$ and a projection objective $LP_r$, $LP_v$, $LP_b$ in such a way that the three images of different colors, contained in the groups $GM_r$, $GM_b$ and $GM_v$ of modulated beams, are superimposed on the projection screen EP.

Figure 6:
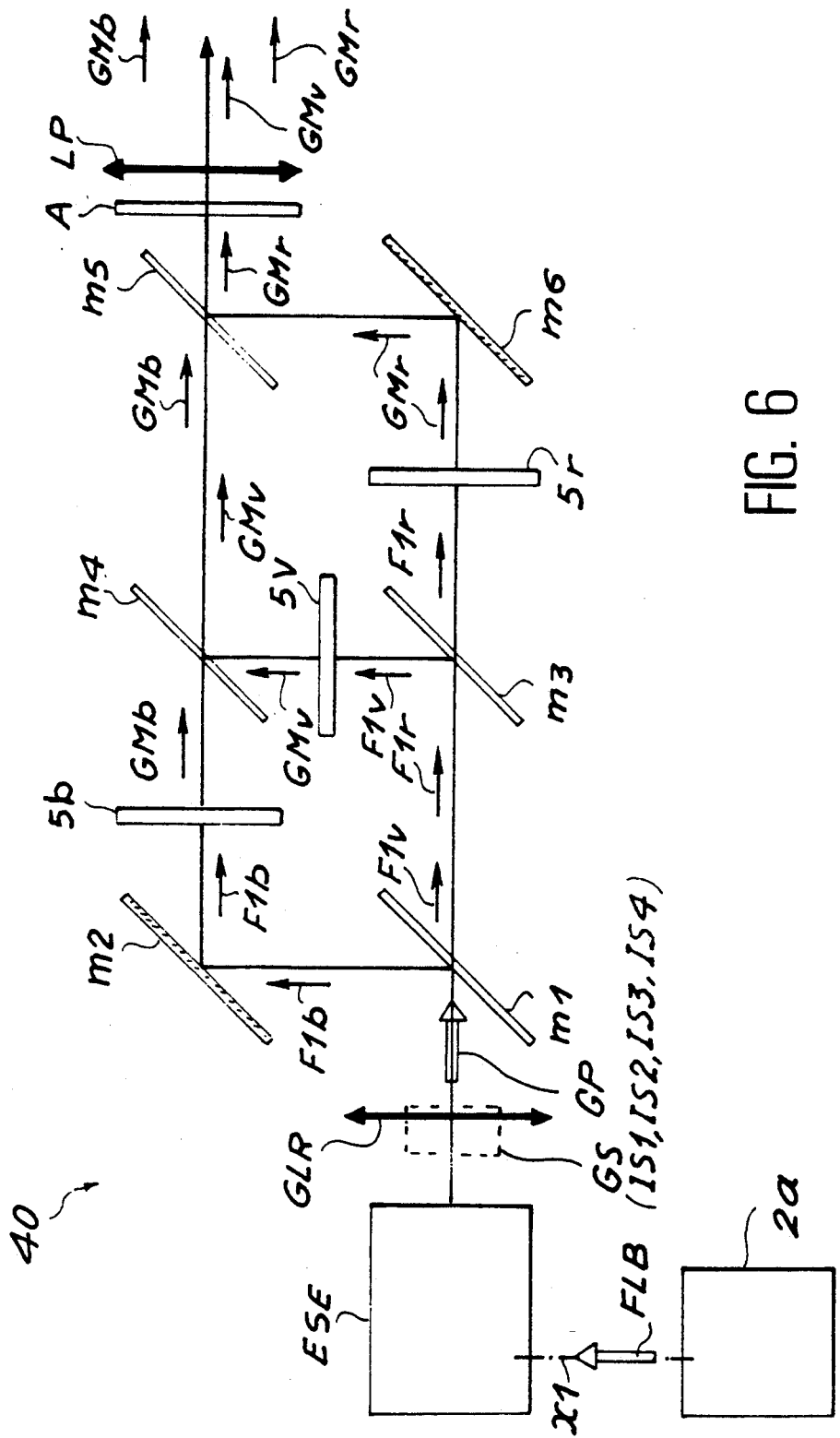
FIG. 6 shows a color image projector in which several light spatial modulation screens cooperate with a single separating/orienting assembly shown in FIGS. 3 and 4.

FIG. 6 gives a schematic view of a color projector 40 that enables the use of a single separating-orienting assembly ESE for several sets of modulations assigned to the processing of the different colors.

The light source 2a produces a beam of non-polarized white light FLB that gets propagated along an axis x1. The beam of white light FLB is applied to a separating orienting assembly ESE similar to that of FIG. 3 for example, in a same way as the source beam FS is applied (in FIG. 3).

The separating-orienting assembly ESE delivers a main group GP of sub-beams (of polarized light) having directions of polarization P of a same type, as in the case of the two polarized beams FP1, FP2'; the sub-beams contained in the group GP form the group of source images GS (comprising the four images IS1 to IS4, not shown) on either side of an optical axis AO, said optical axis AO corresponding to the main optical axis xP shown in FIG. 3. In a same way as in the example shown in FIG. 3, a relay lens may be assigned to each source image IS1 to IS4, which leads to the positioning, substantially in the plane of these source images, of a matrix or group of relay lenses, the presence of which is depicted in FIG. 6 by a single lens referenced GLR.

The source images IS1, IS2, IS3, IS4 contained in the group of source images GS are formed by white light. The main group GP of sub-beams (of white light) gets propagated towards a first wavelength-selective mirror ml sensitive solely to blue light. This mirror reflects the blue component $F1_b$ of the main group GP of sub-beams, namely the blue component of each of the sub-beams (not shown) SF1 to SF4, and transmits the green and red components ($F1_v$, $F1_r$) of these sub-beams, while the blue component gets propagated alone in the direction of a second mirror m2, and the red and green components get propagated towards a third selective mirror m3. The blue component $F1_b$ is reflected by the second mirror m2 towards a matrix screen 5b assigned to the modulation of the blue. The second mirror m2 is illuminated only by the monochromatic mirror, blue for example. It is possible, therefore, that it will be not selective. Under the effect of the third mirror m3, which is sensitive only to the green, the green component $F1_v$ is reflected towards a matrix screen 5v assigned to the green, while the red component $F1_r$ is transmitted by the third mirror m3 towards a matrix screen 5r assigned to the red. Thus, the three components are each made to cross the matrix screen 5r, 5b, 5v that is assigned to them, and each of them then constitutes a group of modulated beams $GM_r$, $GM_b$ and $GM_v$. The group $GM_b$ relating to the blue successively crosses a fourth selective mirror m4 sensitive only to the green and a fifth selective mirror m5 sensitive only to the red, and then reaches the projection objective LP.

The group $GM_v$ relating to the green is reflected by the selective mirror m4 and then crosses the fifth selective mirror m5 to reach the projection objective LP.

Finally, the group $GM_r$ relating to the red is reflected by a sixth mirror m6 which may or may not be selective, and is then reflected again by the selective mirror m5 towards the projection objective LP.

An analyzer may be associated with each matrix screen or else, as shown in FIG. 6, a single analyzer may be interposed, for example between the fifth selective mirror m5 and the projection objective LP. The modulated groups $GM_b$, $GM_r$, $GM_v$ are then propagated towards a projection screen (not shown) on which there are superimposed the three differently colored images, each contained in a modulated group.

The field lenses and the objective lenses are not shown in FIG. 6, but the arrangement of FIG. 6 is compatible with the use of such lenses.

The advantage of this arrangement is notably that it makes it possible to have equal distances between the source images IS1 to IS4 and the matrix screens $5_v$, $5_r$, $5_b$ as well as between these matrix screens and the projection objective LP.

Naturally, it is possible to envisage any permutation of the colors.

What is claimed is:

1. An image projector comprising at least one light spatial modulator screen, at least one light polarization separator illuminated by a non-polarized light beam delivered by a source, the polarization separator producing, in response to said non-polarized light beam, a first polarized beam and a second polarized beam having orthogonal directions of polarization of light with respect to each other, the light of these two polarized beams being designed to be modulated by the spatial modulator screen, said image projector further comprising, separator means designed, firstly, to separate the light of at least one of these two polarized beams into at least two sub-beams having a section, the shape of which is homothetic with that of the spatial modulator screen and, secondly, to superimpose the sub-beams on the spatial modulator screen.

2. A projector according to claim 1, wherein the spatial modulator screen has a rectangular shape.

3. A projector according to claim 2, wherein the spatial modulator screen has the 16/9 format.

4. A projector according to claim 1, wherein the spatial modulator screen is of the liquid crystal display type.

5. A projector according to claim 1, wherein the non-polarized light beam has a circular section.

6. A projector according to claim 1, wherein a set of lenses formed by at least two convergent lenses known as separator lenses is positioned on the path of at least one of the two polarized beams.

7. A projector according to claim 6, wherein each separator lens has a surface, the shape of which is homothetic with that of the spatial modulator screen.

8. A projector according to claim 6, wherein each separator lens is rectangular.

9. A projector according to claim 6 wherein, in each set of lenses, the separator lenses are superimposed so that each set of lenses has a section homothetic with the shape of the section of the polarized beam on the path of which it is positioned.

10. A projector according to claim 6, wherein each set of lenses intercepts the totality of the polarized beam on the path of which it is positioned.

11. A projector according to claim 1, wherein the polarization separator gives the two polarized beams a square section.

12. A projector according to claim 1, further comprising a polarization direction rotator element interposed on the path of either one of the two polarized beams.

13. A projector according to claim 12, wherein the polarization direction rotator element is a liquid crystal cell of the "90° twisted nematic" type.

14. A projection according to claim 1, wherein the polarization separator comprises a polarization separator surface perpendicular to the plane of the spatial modulator screen.

15. A projector according to claim 14, the spatial modulator screen being centered on a main axis normal to this modulator screen, wherein said projector comprises reflection means to reflect the sub-beams at least twice: a first time towards the said main axis and a second time towards the spatial modulator screen so that each sub-beam forms the image of the source after the second reflection and projects, on the spatial modulator screen, an illumination spot whose dimensions coincide with those of the spatial modulator screen.

16. A projector according to claim 1, wherein said separator means, firstly, separates the non-polarized light beam into two polarized beams and then, secondly, converts at least one of the two polarized beams into at least two sub-beams, each forming an image of the source, and wherein said separator means constitutes a so-called separating-orienting assembly cooperating with a spatial modulator screen to make monochromatic images.

17. A projector according to claim 6, further comprising a polarization direction rotator element interposed on the path of either one of the two polarized beams,
wherein the polarization separator, the polarization rotator, and the set of separator lenses serve to constitute a separating-orienting assembly, the polarization separator of which is illuminated by a white non-polarized light, said orienting-separating assembly producing several images of the source, and wherein the separating-orienting assembly cooperates with at least two spatial modulator screens by means of a device for the separation of the colors of light, each spatial modulator screen modulating a light of a different color.

18. An image projection according to claim 17, comprising a separating-orienting assembly cooperating with at least three spatial modulator screens and a single projection objective by means of at least six mirrors, at least four of which are wavelength-selective mirrors, each spatial modulator screen modulating a light of a different color.

* * * * *